(12) United States Patent
Hohenner et al.

(10) Patent No.: US 10,495,154 B2
(45) Date of Patent: Dec. 3, 2019

(54) DEVICE FOR TRANSMITTING A TORQUE IN A RANGE EXTENDER

(71) Applicant: Bayerische Motoren Werke Aktiengesellschaft, Munich (DE)

(72) Inventors: Hans Hohenner, Munich (DE); Stefan Rudert, Fahrenzhausen (DE); Daniel Stopper, Olching (DE); Ingo Beuck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 110 days.

(21) Appl. No.: 15/151,744

(22) Filed: May 11, 2016

(65) Prior Publication Data
US 2016/0252136 A1 Sep. 1, 2016

Related U.S. Application Data

(63) Continuation of application No. PCT/EP2015/051089, filed on Jan. 21, 2015.

(30) Foreign Application Priority Data

Feb. 14, 2014 (DE) .......................... 10 2014 202 696

(51) Int. Cl.
*F16D 1/02* (2006.01)
*F16D 1/00* (2006.01)

(52) U.S. Cl.
CPC ................. *F16D 1/02* (2013.01); *F16D 1/00* (2013.01); *F16D 2300/06* (2013.01); *F16D 2300/08* (2013.01); *Y10S 277/912* (2013.01)

(58) Field of Classification Search
CPC .......... F16D 1/02; F16D 1/00; F16D 2300/06; F16D 2300/08; Y10S 277/912
(Continued)

(56) References Cited

U.S. PATENT DOCUMENTS 2,521,420 A * 9/1950 Spotz .................. F04C 15/0076
277/912
2,964,929 A * 12/1960 Hoffman ................. F16C 17/06
464/16

(Continued)

FOREIGN PATENT DOCUMENTS

CN 101294606 A 10/2008
CN 101868616 A 10/2010
(Continued)

OTHER PUBLICATIONS

Chinese-language Office Action issued in Chinese Application No. 201580003203.9 dated Jun. 29, 2017 with English translation (Eight (8) pages).

(Continued)

*Primary Examiner* — Greg Binda
(74) *Attorney, Agent, or Firm* — Crowell & Moring LLP

(57) ABSTRACT

A device for transmitting a torque between an internal combustion engine and a generator has a motor-side shaft, a generator-side shaft, a separate transmission element for transmitting the torque between the two shafts, and a seal device. The motor-side shaft and the generator-side shaft are situated in each case substantially coaxially with respect to one another and are in each case connected by way of a shaft-hub connection to the transmission element, wherein a lubricant chamber which is situated radially outside the transmission element and between the motor-side shaft and the generator-side shaft and which couples the two shaft-hub connections with regard to a flow of lubricant is sealed off with respect to the outside by the seal device.

14 Claims, 2 Drawing Sheets

(58) Field of Classification Search
USPC .......................... 464/7, 16, 18; 277/618, 912
See application file for complete search history.

(56) References Cited

U.S. PATENT DOCUMENTS

| | | | |
|---|---|---|---|
| 3,621,937 A | 11/1971 | Edge et al. | |
| 3,889,489 A * | 6/1975 | Casey | ............... F16D 3/06 |
| | | | 464/16 |
| 6,189,669 B1 | 2/2001 | Kremer et al. | |
| 7,832,189 B1 * | 11/2010 | Ehrhart | ............ A01D 34/665 |
| | | | 464/16 X |
| 2008/0268992 A1 | 10/2008 | Mitsubori et al. | |
| 2009/0159370 A1 | 6/2009 | Maners et al. | |
| 2009/0243227 A1 | 10/2009 | Omagari et al. | |
| 2010/0193296 A1 | 8/2010 | Sora | |
| 2011/0048358 A1 | 3/2011 | Gaborel et al. | |
| 2012/0103751 A1 | 5/2012 | Ikeda et al. | |
| 2013/0153355 A1 | 6/2013 | Kummer et al. | |

FOREIGN PATENT DOCUMENTS

| | | |
|---|---|---|
| CN | 102465977 A | 5/2012 |
| CN | 103161841 A | 6/2013 |
| CN | 203146647 U | 8/2013 |
| CN | 103403382 A | 11/2013 |
| DE | 11 2009 000 034 T5 | 9/2010 |
| DE | 20 2013 104 531 U1 | 10/2013 |
| EP | 2 028 365 A2 | 2/2009 |
| JP | 2008-190718 A | 8/2008 |
| JP | 2010-180911 A | 8/2010 |
| WO | WO 2012/119612 A1 | 9/2012 |

OTHER PUBLICATIONS

International Search Report (PCT/ISA/220 & PCT/ISA/210) issued in PCT Application No. PCT/EP2015/051089 dated May 4, 2015 with English translation (seven pages).

* cited by examiner

DEVICE FOR TRANSMITTING A TORQUE IN A RANGE EXTENDER

CROSS REFERENCE TO RELATED APPLICATIONS

This application is a continuation of PCT International Application No. PCT/EP2015/051089, filed Jan. 21, 2015, which claims priority under 35 U.S.C. § 119 from German Patent Application No. 10 2014 202 696.2, filed Feb. 14, 2014, the entire disclosures of which are herein expressly incorporated by reference.

BACKGROUND AND SUMMARY OF THE INVENTION

The invention relates to a device for transmitting a torque between an internal combustion engine and a generator of a vehicle.

Various solutions are known for connecting an internal combustion engine to an electric generator in a vehicle to create a range extender. For example, a shaft can be provided between the internal combustion engine and the generator, which shaft transmits the torque from the motor to the generator by means of two shaft/hub connections. To this end, on one hand, a shaft/hub connection to the crankshaft of the motor and, on the other hand, a shaft/hub connection to the input shaft of the generator are required.

Shaft/hub connections are, however, highly subject to wear, as a result of which the lifespan of the individual parts is significantly reduced. A large degree of wear occurs in particular if the crankshaft of the motor and the input shaft of the generator are not perfectly flush with one another.

The object of the invention is to provide a device which can, in a simple manner, transmit a torque from the motor to the generator and has a low degree of wear for this purpose.

The object is achieved by a device for transmitting a torque between an internal combustion engine and a generator, with a motor-side shaft, a generator-side shaft, a separate transmission element for transmitting the torque between both shafts and a seal device. The motor-side shaft and the generator-side shaft are arranged in each case substantially coaxially in relation to one another and are connected in each case via a shaft/hub connection to the transmission element. The seal device seals off to the outside a lubricant chamber which lies radially outside the transmission element, between the motor-side shaft and the generator-side shaft and which couples the two shaft/hub connections in terms of lubricant flow. As a result of the invention, it is possible to arrange both the shaft/hub connection between the motor and the transmission element and also the shaft/hub connection between the transmission element and the generator-side shaft in a joint lubricant chamber, as a result of which an effective lubrication of the shaft/hub connections and thus a significant reduction in wear are enabled. In contrast to two separate lubricant chambers for, in each case, one of the shaft/hub connections, a significant simplification and thus cost savings are provided by the invention.

At least one lubricant intake is preferably provided in one of the two shafts, in particular in the motor-side shaft. As a result, a simple filling of the lubricant chamber with lubricant is enabled.

For example, the lubricant chamber is connected to the lubricant circuit of the internal combustion engine in terms of flow engineering, as a result of which the device is much easier to realize since use can be made of the existing lubricant circuit of the internal combustion engine.

In one embodiment of the invention, the seal device has at least one seal element which, at at least one axial end, overlaps with an, in particular, tubular seal extension on one of the shafts and bears against this seal extension so that a reliable sealing off of the lubricant chamber is enabled.

For example, the seal element has an axial end with a conical seal surface with which it overlaps with the seal extension, wherein the seal extension has a complementary, conical counter-surface which contacts the seal surface. The sealing action of the sealing element can be further increased in this manner.

In one embodiment variant, at least on one of the two shafts an axially projecting, in particular tubular shell part is provided which extends around the transmission element and delimits the lubricant chamber radially to the outside at least in portions. A reliable and impervious delimitation of the lubricant chamber is possible as a result of the shell part.

The shell part is preferably embodied integrally with the generator-side shaft and the seal element bears radially on the inside against the shell part and is guided by it so that precise positioning of the seal element is ensured. For example, the shell part and the seal extension overlap so that the gap to be sealed off by the seal element is as small as possible.

In one configuration of the invention, the seal device has at least one seal element which is axially tensioned between the shafts. As a result, simple mounting of the device is enabled and by which an axial contact to avoid a gap between seal element and adjacent part is ensured.

In one embodiment variant, the seal device has at least one spring which is supported on one of the two shafts, in particular that shaft which does not have the seal extension. The spring pushes the seal element with a force against the other shaft. In this manner, a high level of imperviousness of the seal device is permanently ensured since the seal element is held continuously in its optimum position.

For example, the seal element is embodied as a sleeve or as an O-ring, as a result of which it is inexpensive to produce.

In one embodiment, at least one of the two shafts is embodied as a hollow shaft with a torque transmission profile, in particular a toothing, which is connected in a positive-locking manner to a complementary profile on the transmission element. As a result, the transmission of torque of the shaft/hub connection is ensured in a simple, but very reliable manner.

Other objects, advantages and novel features of the present invention will become apparent from the following detailed description of one or more preferred embodiments lien considered in conjunction with the accompanying drawings.

DETAILED DESCRIPTION OF THE DRAWINGS

Figure 1:
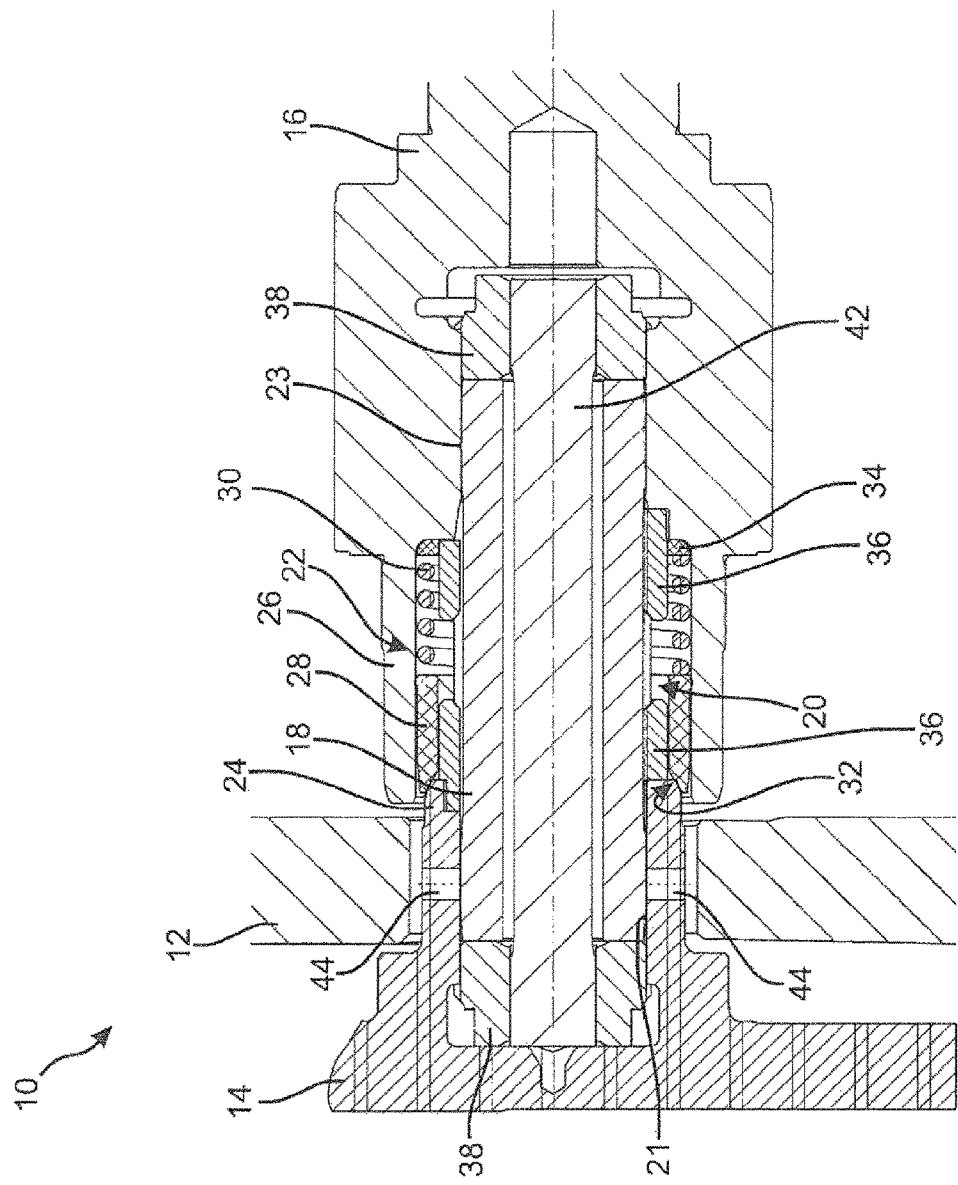
FIG. 1 is a sectional view of a device according to an embodiment of the invention.

FIG. 1 shows a device 10 for transmission of a torque between an internal combustion engine (not shown) and a generator (not shown).

The internal combustion engine (motor) is located on the left side in relation to the representation of FIG. 1. Of this, only a part of crankcase 12 and the shaft end of the crankshaft, referred to below as motor-side shaft 14, are represented.

The electric generator is also not represented, rather only an input shaft is shown. The input shaft of the generator is referred to below as generator-side shaft 16. Representation of the housing of the generator was omitted for clarity. The generator is part of the drive of an electric vehicle, the internal combustion engine is what is known as a range extender which drives the generator to charge the accumulator.

Both shafts 14, 16 can be embodied as hollow shafts and are arranged substantially coaxially in relation to one another. Both shafts 14, 16 are only separated from one another by an annular gap so that shafts 14, 16 form a cavity.

A tubular transmission element 18, which is separate from shafts 14, 16 and which connects both shafts 14, 16 in a rotationally conjoint manner to one another, is provided in the cavity. To this end, shaft/hub connections 21, 23 are provided between shafts 14, 16 and the axial end portions of transmission element 18.

In detail, both shafts 14, 16 have on their radially internal sides a torque transmission profile, in particular a toothing.

Motor-side shaft 14 furthermore extends through an opening in crankcase 12. A slide bearing (not shown) is provided in this opening so that motor-side shaft 14 can rotate freely.

A lubricant chamber 20, which extends from motor-side shaft 14 to generator-side shaft 16, is internally delimited by transmission element 18.

Lubricant chamber 20 is sealed off to the outside by a seal device 22 which covers the gap between shafts 14, 16.

Motor-side shaft 14 can have in particular a tubular, axially projecting seal extension 24 on its side facing generator-side shaft 16.

Generator-side shaft 16 has in a similar manner in particular a tubular, axially projecting shell part 26 which can be embodied in particular integrally with generator-side shaft 16 and extends towards motor-side shaft 14.

Both seal extension 24 and shell part 26 extend around transmission element 18 and thus delimit lubricant chamber 20 radially to the outside at least in portions.

Shell part 26 can extend in the axial direction so far in the direction of motor-side shaft 14 that it overlaps with seal extension 24 at least partially axially and radially and an annular gap is formed between shell part 26 and seal extension 24. To this end, the inner radius of shell part 26 is embodied to be larger than the outer radius of seal extension 24.

The gap can be sealed off by seal device 22 which includes a seal element 28 and a spring 30.

Seal element 28 is embodied as a sleeve and has an axial end with a conical seal surface 32 which is embodied in a complementary manner to a conical counter-surface on seal extension 24.

Seal element 28 is at least partially arranged in the gap between shelf part 26 and seal extension 24 and can bear radially on the inside against shell part 26 and be guided there. For example, seal element 28 completely fills the gap in the radial direction.

Seal element 28 also overlaps with seal extension 24 in such a manner that seal surface 32 contacts the counter-surface of seal extension 24. Seal element 28 bears against seal extension 24 in a pretensioned manner.

In the embodiment shown, spring 30 is also provided radially on the inside on shell part 26 and is supported with one end on generator-side shaft 16. So that spring 30 can be better supported on generator-side shaft 16, a bearing element 34 can be provided between spring 30 and generator-side shaft 16.

With the other end, spring 30 is in contact with seal element 28 and acts upon seal element 28 with a force against motor-side shaft 14. Seal surface 32 is pressed against the counter-surface of seal extension 24 by the force.

Spring 30 and seal element 28 are supported by spacer sleeves 36 on the radially internal side. For example, spacer sleeves 36 extend substantially axially in the region of shell part 26.

The tubular spacer sleeve furthermore extends around transmission element 18.

A pretensioning unit has three parts, namely two end pieces 38 and a torsion spring 42. End pieces 38 are axially spaced apart from one another, connected to one another by way of a torsion spring 42 and are fastened in a rotationally conjoint manner to torsion spring 42 itself, for example, via a polygon. Torsion spring 42 is, for example, a torsion rod.

Torsion spring 42 extends through hollow transmission element 18.

Both end pieces 38 and transmission element 18 have a profile which is complementary to the torque transmission profile of shafts 14, 16. End pieces 38 engage in motor-side shaft 14 or generator-side shaft 16. Transmission element 18 engages both in motor-side shaft 14 and in generator-side shaft 16.

Due to the fact that the torque transmission profiles are formed in a complementary manner, transmission element 18 is connected to shafts 14, 16 in a positive-locking manner.

In the embodiment shown, shaft/hub connection 21, 23 between motor-side shaft 14 and transmission element 18 and between generator-side shaft 16 and transmission element 18 are realized by means of splines.

Of course, other shaft/hub connections are contemplated.

Moreover, both end pieces 38 are tensioned against one another in the circumferential direction by torsion spring 42 so that both end pieces 38 also pretension motor-side shaft 14 and generator-side shaft 16 against one another. As a result of this, it is achieved that transmission element 18 bears against both motor-side shaft 14 and against generator-side shaft 16 without play.

During operation of device 10, lubricant will flow into lubricant chamber 20. This can be carried out by at least one lubricant intake 44 which is provided in one of two shafts 14, 16. The lubricant circuit of device 10 is connected via lubricant intake 44 in terms of flow engineering to the lubricant circuit of the internal combustion engine in crankcase 12.

In the embodiment shown, lubricant intake 44 is realized in motor-side shaft 14 as an opening. In this case, the lubricant intake can be located in the region of the slide bearing between crankcase 12 and motor-side shaft 14.

Due to the fact that seal device 22 seals off lubricant chamber 20 towards the outside, a lubricant flow can be formed between the two shaft/hub connections 21, 23 and it is possible to ensure the lubrication of shaft/hub connections 21, 23 by only one lubricant circuit already present. Wear of shaft/hub connections 21, 23 is reduced in a simple manner.

Figure 2:
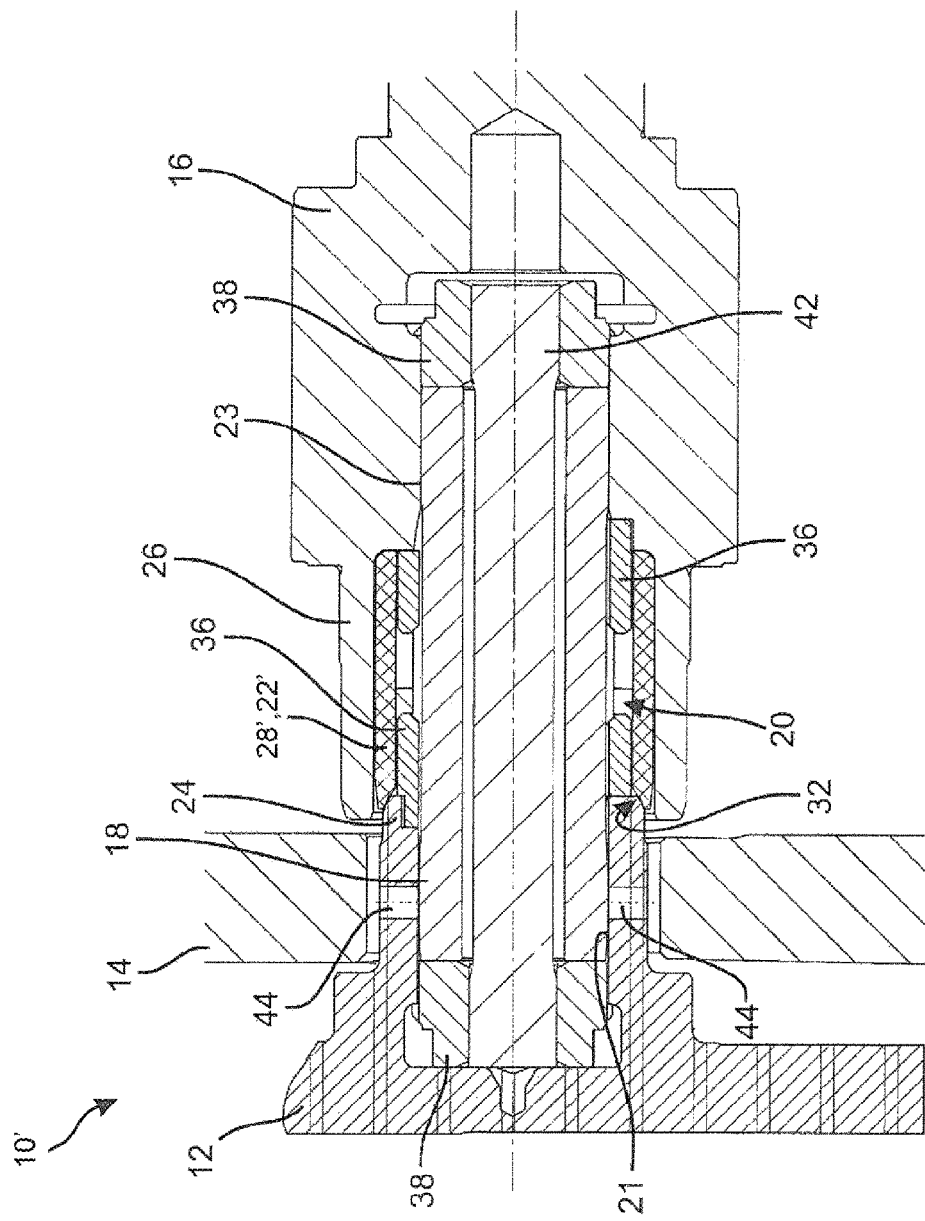
FIG. 2 is a sectional view of a further embodiment of a device according to the invention.

A further embodiment of device 10' is represented in FIG. 2, wherein identical parts and parts with identical functions are provided with the same reference numbers. Only the differences are discussed in detail below.

Seal device 2 of the embodiment according to FIG. 2 is realized only by a seal element 28'. Seal element 28' overlaps with one end, as described in relation to the embodiment according to FIG. 1, with seal extension 24, but the other end of seal element 28' is supported directly on generator-side shaft 16.

In the unmounted state, the axial length of seal element 28' is longer than the axial distance between seal extension 24 and generator-side shaft 16 into which seal element 28' is inserted.

Seal element 28' is correspondingly pressed in during mounting so that seal element 28' is axially tensioned between shafts 14, 16. As a result, spring 30 of the first embodiment can be omitted since its function is taken on by seal element 28' itself.

It is also contemplated that seal element 28' is embodied as an O-ring and is arranged, in particular radially, between seal extension 24 and shell part 26. In this case, seal extension 24 can be provided on its outer circumference and/or shell part 26 can be provided on its inner circumference with a groove in which the O-ring is provided in order to hold the O-ring in the desired position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for transmitting a torque between an internal combustion engine and a generator, the device comprising:
    a motor-side shaft;
    a generator-side shaft;
    a separate transmission element that transmits torque between the motor-side shaft and the generator-side shaft, wherein the motor-side shaft and the generator-side shaft are arranged substantially coaxially with respect to one another and are connected via a respective shaft/hub connection to the separate transmission element;
    a lubricant chamber is formed radially outside the transmission element between the motor-side shaft and the generator-side shaft;
    a seal device configured to externally seal-off the lubricant chamber, wherein the seal device includes a seal element and a spring; and
    at least one lubricant intake provided in one of the motor-side shaft and the generator-side shaft.

2. The device according to claim 1, wherein at least one lubricant intake is provided in the motor-side shaft.

3. The device according to claim 1, wherein the lubricant chamber is fluidly connected to a lubricant circuit of the internal combustion engine.

4. The device according to claim 1, wherein:
    at one axial end of the seal element, the seal element overlaps with a tubular seal extension on one of the motor-side shaft and the generator-sides shaft, and
    the one axial end of the seal element bears against the tubular seal extension.

5. The device according to claim 4, wherein:
    the axial end of the seal element has a conical seal surface that overlaps with the seal extension, and
    the seal extension has a complementary conical counter-surface that contacts the conical seal surface.

6. The device according to claim 4, wherein:
    at least one of the motor-side shaft and the generator-side shaft has an axially projecting tubular shell part that extends around the transmission element and delimits the lubricant chamber radially outwardly at least in portions.

7. The device according to claim 6, wherein the tubular shell part and the tubular seal extension overlap one another.

8. The device according to claim 4, wherein:
    the spring is supported on one of the motor-side shaft and the generator-side shaft that does not have a tubular seal extension, and
    the spring is configured to press the seal element with a force against the tubular seal extension on the other one of the motor-side shaft and the generator-side shaft.

9. The device according to claim 4, wherein the seal element is configured as a sleeve or an O-ring.

10. The device according to claim 1, wherein:
    at least one of the motor-side shaft and the generator-side shaft has an axially projecting tubular shell part that extends around the transmission element and delimits the lubricant chamber radially outwardly at least in portions.

11. The device according to claim 10, wherein:
    the tubular shell part is configured integrally with the generator-side shaft, and
    the seal element bears against and is guided on a radially inner surface of the tubular shell part.

12. The device according to claim 1, wherein the seal element is axially tensioned between the motor-side shaft and the generator-side shaft.

13. The device according to claim 1, wherein the spring is supported on one of the motor-side shaft and the generator-side shaft, the spring pressing the seal element against the other one of the motor-side shaft and the generator-side shaft.

14. The device according to claim 1, wherein:
    at least one of the motor-side shaft or the generator-side shaft is configured as a hollow shaft having a torque transmission profile, the at least one of the two shafts being connected in a positive-locking manner to a complementary profile on the transmission element.

* * * * *